United States Patent [19]

Stauffer

[11] Patent Number: 4,655,586
[45] Date of Patent: Apr. 7, 1987

[54] ADJUSTABLE ZONE PROXIMITY SENSOR

[75] Inventor: Norman L. Stauffer, Englewood, Colo.

[73] Assignee: Honeywell Inc., Minneapolis, Minn.

[21] Appl. No.: 594,607

[22] Filed: Mar. 19, 1984

[51] Int. Cl.$^4$ .................. G01C 3/00; G01C 5/00; G03B 3/00
[52] U.S. Cl. ............................ 356/1; 354/403; 354/406
[58] Field of Search ............... 356/1, 4; 354/403, 406

[56] References Cited

U.S. PATENT DOCUMENTS

| 3,682,071 | 8/1972 | Hosoe | 356/4 |
| 3,720,148 | 3/1973 | Harvey | 250/204 |
| 3,723,003 | 3/1973 | Vockenhuber et al. | 356/4 |
| 3,736,057 | 5/1973 | Harvey | 356/1 |
| 3,759,615 | 9/1973 | Loewe | 356/4 |
| 3,836,919 | 9/1974 | Matsumoto et al. | 356/5 |

Primary Examiner—Stephen C. Buczinski
Attorney, Agent, or Firm—Charles J. Ungemach

[57] ABSTRACT

A compact single lens position sensor with adjustable range and detection zone utilizing two pairs of detectors, at least one of which is adjustable in position so as to produce unique signals when an object is in a near zone, ok zone, and far zone.

27 Claims, 2 Drawing Figures

ADJUSTABLE ZONE PROXIMITY SENSOR

BACKGROUND OF THE INVENTION

The present invention provides a simple yet highly accurate device for producing a signal indicative of whether a given object is within an acceptable range of distances from the apparatus and also to provide a signal indicative of whether the object is beyond the near side of the acceptable range or beyond the far side of the acceptable range. Devices of this nature have uses in, for example, robot control where it is desired to have the robot arm move out and operate on an object so long as the object is within an acceptable range of the arm. Another example of possible use is in filling containers with material to determine that the level of material is in an acceptable range and neither too full nor too empty. It is also desirable that the equipment be compact for easy mounting on a robot arm or above a conveyer belt, that it be easy to adjust, quite accurate, and preferrably have a detection zone which may be set to predetermine desired acceptable limits while at the same time allowing for settings to adjust the distance between the apparatus and the remote object so that it may be used in various applications.

BRIEF DESCRIPTION OF THE INVENTION

The present invention provides such an apparatus with the use of an "active" range finding system in which a beam of radiation is projected to the object and the return radiation is focused on a plane containing two detectors which are mounted substantially edge to edge. When the object is at the exact desired distance, the return radiation will be focused in the area between the two detectors so both of the detectors will receive the same amount of radiation. Thereafter, as the object moves away from the exact range, the image will move onto one of the detectors and away from the other, while if the object moves closer than the exact range, the image will move onto the other of the detectors and away from the first. With appropriate electronics it can be determined whether the return radiation is falling primarily on the one detector, the other detector, or is between them. This then determines whether the object is too far, too near, or at the right distance respectively. A prior art system which could be used for the application thus far described is found in U.S. Pat. No. 3,736,057, issued to Donald M. Harvey on May 29, 1973. This prior art system teaches only a two zone range finder, not a proximity sensor and does not provide an "acceptable" zone nor any way of adjusting the limits of such a zone nor does it teach any way to adjust the distance to the "acceptable" zone.

The present invention accomplishes these desired results by providing a second pair of detectors which receive energy reflected from the object over a second path such as by reflection from a beam splitter located in the return path of the energy. The second pair of detectors is moveable so as to vary the position of the area between the detectors and by doing so to provide a way for adjusting the width of the "acceptable" zone. As described above, when the return energy is focused in the center of the first pair of detectors, both detectors receive the same amount of radiation as an indication of a first range to the object. The second pair of detectors can be offset slightly so that the object must move away from that the first range to a second range before the reflected energy would be falling on the area just between the second pair of detectors. Thus, from the point where the energy was just between the first pair of detectors to where it was exactly between the second pair of detectors constitutes the zone of "acceptable" ranges to the object. The width of this zone is adjustable by further movement of the second pair of detectors. Furthermore, the optimum distance to the remote object can be set by adjusting the main lens of the system so that the return energy will focus just between the first pair of detectors when at a different distance than in the first instance.

DETAILED DESCRIPTION OF THE PREFERRED EMBODIMENT

Figure 1:
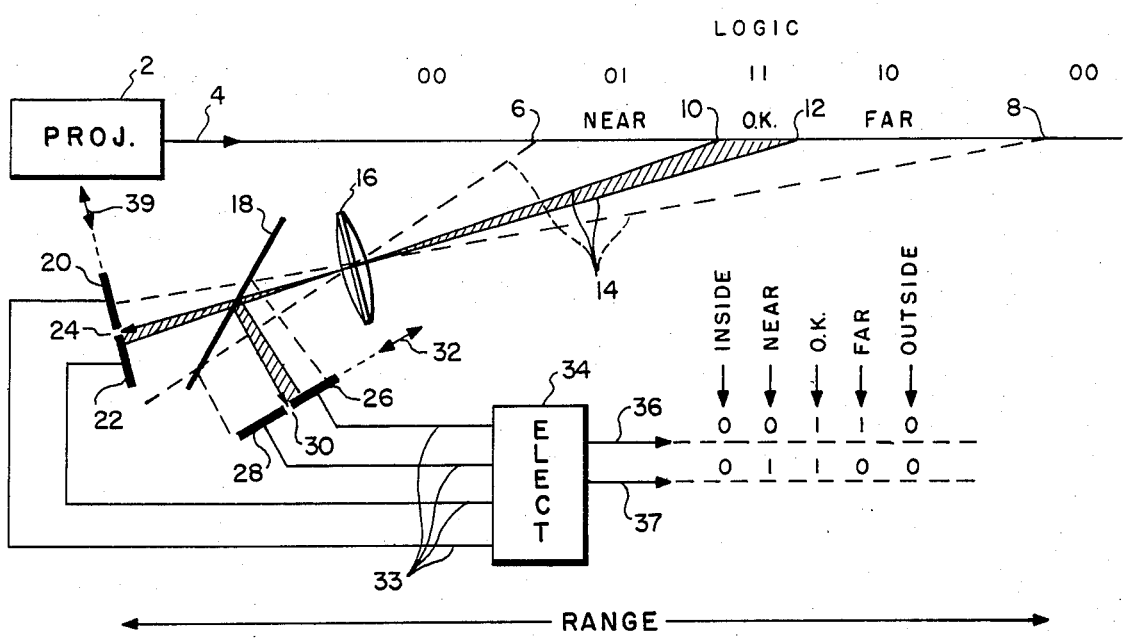
FIG. 1 shows a schematic and block diagram of the optics and electronics of the present invention with respect to a range of possible distances to a remote object.

Referring to FIG. 1, a box 2 labelled "proj" is a projector operable to direct radiation, preferably in the infrared range, towards the remote object along a path shown by an arrow 4. The object may be located anywhere along the path of arrow 4 but generally will exist within the normal range of the system which is between points 6 and 8 in FIG. 1. In the preferred embodiment the distance from the apparatus to points 6 and 8 is about 6 inches to about 4 feet respectively although these limits are obviously variable to meet the requirements of the system in which the apparatus is to be used. As mentioned above, it is desirable to have a range that is considered "acceptable" or "ok" and this is shown in FIG. 1 as the area between a point 10 and a point 12 and is indicated by the letters "ok". Between point 6 and point 10 is considered the "near" range and between point 12 and point 8 is considered the "far" range. When digital logic is used, it may be set up so that in the ok range the apparatus produces a "1,1" signal, in the near range a "0,1" signal, and in the far range a "1,0" signal. Beyond the normal range limits of the system on both sides, a "0,0" logic signal can be made to occur.

The energy from projector 2 passing along path 4 is reflected off the object and returns along a path such as is shown by one of the lines 14 in FIG. 1 correspondiing to reflections from the object if it were at points 6, 10, 12, or 8. The reflected energy passes through a lens 16 and then through a half silvered mirror 18 to a first pair of detectors 20 and 22. Detectors 20 and 22 are radiation sensitive devices such as photodiodes and are positioned at an image plane of lens 16 and are adjacent one another so that a null area 24 exists as a line therebetween. Lens 16 may be moved so as to set the position of the reflected energy on null line 24 when the object is located at point 12 (the far edge of the ok zone) in which event, since the reflected energy has some lateral dimensions, will cause substantially equal amounts of radiation to fall on detectors 20 and 22. If the object were in the near and ok zones between points 6 and 12, then the reflected energy would fall primarily on detector 22 and less or not at all on detector 20 whereas if the object were in the far zone between points 12 and 8, then the reflected energy would fall primarily on detector 20 and less or not at all on detector 22. The apparatus thus far described in quite similar to that found in the Donald M. Harvey U.S. Pat. No. 3,736,057 mentioned above.

The half silvered mirror 18 operates to direct a portion of the reflected energy down towards a second pair of detectors 26 and 28 which are also located in the image plane of lens 16 and are mounted adjacent one another so as to provide a null line 30 therebetween. Detectors 28 and 26 are mounted so as to be moveable along a direction shown by double arrow 32 in FIG. 1 and thus, after lens 16 has placed the far edge of the ok zone so that reflected energy therefrom will fall on the null line 24 between detectors 20 and 22, detectors 26 and 28 can be moved to a position where energy from the near edge of the ok zone, that is, point 10, will fall on the null line 30 between detectors 26 and 28. Energy being reflected from the near zone between lines 6 and 10 will primarily fall on detector 28 and less or not at all on detector 26 while energy being reflected from the ok and far zones between points 10 and 8 will primarily fall on detector 26 and less or not at all on detector 28.

It is therefore seen that as an object moves in the near zone from point 6 to point 10 in FIG. 1 it will cause a signal primarily from detectors 22 and 28. At point 10, the object will produce substantially equal signals from detectors 26 and 28 but will continue producing a signal primarily from detector 22 of the pair of detectors 20 and 22 until it reaches point 12. At point 12, detectors 20 and 22 will produce substantially equal signals but detector 26 will produce the primary signal from the pair of detectors 26 and 28. Thereafter as the object moves in the far zone from point 12 to point 8, the signals will be primarily from detectors 20 and 26. These signals are presented by means of lines such as 33 to the electronics of the system shown as a box 34 labelled "elect" which will be hereinafter described in greater detail.

The output from the electronics 34 may be made to appear as a logical signal, "0" or "1", on a pair of output lines 36 and 37. For example, when the object is in a near zone between points 6 and 10, line 36 may carry a "0" while line 37 carries a "1". In the ok zone between points 10 and 12, both lines 36 and 37 may carry "1" signals and in the far zone between points 12 and 8, line 36 may carry a "1" while line 37 carries a "0". If the object is inside of point 6 or outside of point 8, then the output on lines 36 and 37 can both be made "0" as will be hereinafter explained. These unique signals thus indicate which zone the object occupies as is seen by the arrows labelled "INSIDE", "NEAR", "OK", "FAR", and "OUTSIDE" in FIG. 1.

Of course, it is seen that by moving detectors 26 and 28 along the arrow shown as 32, the size of the ok zone or, more particularly point 10, can be made to move along the range of the system shown by arrow 4. It should be obvious to those skilled in the art that detectors 20 and 22 may also be made to move along a direction such as is shown by double arrow 39 in FIG. 1 and thus cause point 12 to move along the range of the system. Generally speaking, however, it is sufficient to have lens 16 move to position the point 12 for most applications of the present invention.

Figure 2:
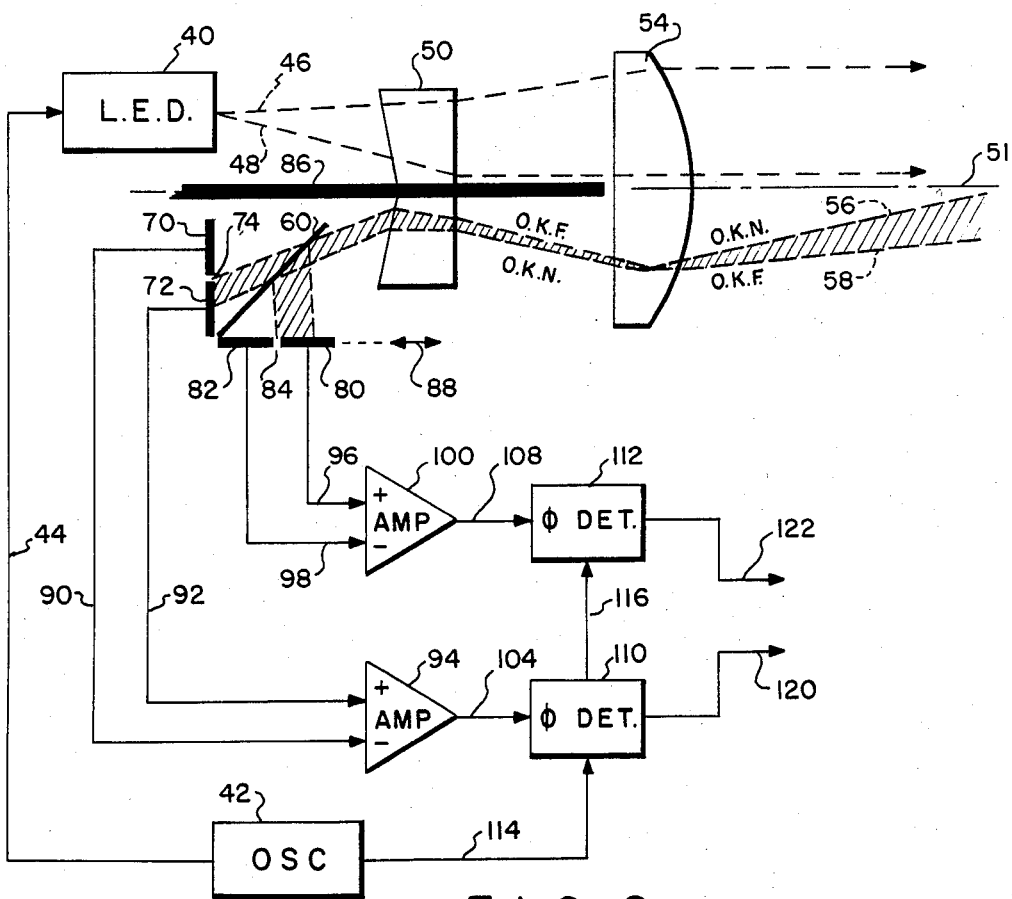
FIG. 2 shows a more detailed schematic and block diagram of the optics and electronics of the preferred embodiment of the present invention.

Referring now to FIG. 2, a radiant energy generating device which may be a light emitting diode 40 shown in FIG. 2 as a box with the inscription "L.E.D." therein is shown receiving a signal from an oscillator 42 via a line 44 so as to produce a modulated light beam which leaves the light generating device 40 in a direction shown by dash line arrows 46 and 48. The energy may first pass through the upper portion of a prism 50 which bends the radiation to allow projector 40 to be spaced from the optic axis 51 and which may not be needed in some applications and then to a focus lens 54 where it is transmitted towards the remote object. It is preferable that the modulated energy be in the form of infrared energy, for example, at a wavelength of about 930 nanometers so as to reduce noise from visible light and also be modulated at, for example, a frequency of 4 kilohertz so as to distinguish the transmitted and reflected energy from ambient radiation around the system. In any event, the energy is transmitted to the remote object, is reflected therefrom, and returns toward the system along paths such as are shown as dash line arrows 56 and 58. For purposes of explanation, it will be presumed that the ray shown by dashed line 56 eminates from an object at the near limit of the ok zone (e.g., point 10 in FIG. 1) and the ray shown by dashed line 58 eminates from an object at the far limit of the ok zone (e.g., point 12 in FIG. 1). Ray 56 is therefor labelled OKN and ray 58 is labelled OKF. The angles that rays 56 and 58 make with the optic axis 51 have been exaggerated for clarity and the ray from the near and far limits (e.g., from points 6 and 8 in FIG. 1) have been omitted. The return energy is focused by the lower portion of lens 54 and is transmitted to the lowe portion of prism 50. It should be noted that the OKF ray 58 is now above the OKN ray 56. These rays then pass through a beam splitter 60 where a first portion of the radiation is passed through to a pair of detectors 70 and 72 having a junction or null point 74 therebetween, and a second portion is reflected down from the beam splitter 60 to a pair of detectors 80 and 82 having a junction or null point 84 therebetween. A cross talk baffle plate 86 is shown in FIG. 2 extending from the lens backwards to just beyond the detectors 70 and 72 so as to prevent cross over of energy between the going out path and the return path behind the lens.

The first pair of detectors 70 and 72 are shown in FIG. 2 to be in a plane substantially transverse to the optic axis 51 and so arranged that when lens 54 is appropriately positioned, the junction 74 between them receives radiation from ray 58, i.e., when the object is at the far edge of the ok zone. The second pair of detectors 80 and 82 is shown mounted in a plane substantially perpendicular to the plane of detectors 70 and 72 and thus substantially along the direction of the optic axis 51. Detectors 80 and 82 are likewise mounted edge to edge and are placed so as to be moveable along a direction shown by double arrow 88. Detectors 80 and 82 are moved (after lens 54 has been set to place the OKF ray 58 at the point 74) so that the OKN ray 56 falls on point 84 between detectors 80 and 82, which, in effect, sets the near edge of the ok zone for the apparatus.

If the remote object starts from further out than the far edge of the ok zone, radiation reflected therefrom will fall primarily on detectors 70 and 80. As the object moves nearer, the radiation will move down on detectors 70 and 72 and to the left on detectors 80 and 82. When the object reaches the far edge of the ok zone, radiation will fall substantially equally on detectors 70 and 72 but still primarily on detector 80 of the pair of detectors 80 and 82. Thereafter as the object moves more toward lens 54, the reflected radiation from the object will continue to move down on detectors 70 and 72 and to the left on detectors 80 and 82 so as to fall primarily onto detectors 72 and 80 until it arrives at the near edge of the ok zone. At this point, the reflected radiation hits the line between the detectors 80 and 82 so that their outputs are substantially equal while detector 72 receives the primary radiation in the pair of detectors 70 and 72. Further motion of the object toward lens 54 causes the radiation to fall primarily onto detectors 72 and 82. It is therefore seen that there will be a signal primarily from detectors 70 and 80 when the object is in the far zone, substantially equal signals from detectors 70 and 72 when the object crosses the far edge of the ok zone but still a signal primarily from detector 80 in the other pair, be substantially equal from detectors 80 and 82 when the object moves to the near limit of the ok range and thereafter in the near range the signals will be primarily from detectors 72 and 82.

The signals from detectors 70 and 72 are connected by lines 90 and 92 to the minus and plus inputs respectively of the differential amplifier 94. The outputs of detectors 80 and 82 are connected by lines 96 and 98 to the plus and minus inputs respectively of a differential amplifier 100. The outputs of differential amplifiers 94 and 100 are indicative of which of its inputs receives the largest signal and these outputs are presented by means of lines 104 and 108 respectively to a pair of phase detectors 110 and 112 which also receive energy from oscillator 42 by means of lines 114 and 116 respectively. The phase detectors 110 and 112 determine the phase of the output signal from amplifiers 94 and 100 and convert these signals to a logical "0" or "1" depending on that phase.

Thus, it is seen that if the object is in the far range, where the radiation will be primarily on detectors 70 and 80, amplifier 94 will receive a greater signal from detector 70 than from detector 72 so as to produce an output of a first phase or minus on line 104. On the other hand, amplifier 100 will receive a greater signal from detector 80 than it will from detector 82 and accordingly will produce a signal of a second phase or plus on line 108. A signal of the first phase on line 104 will be interpreted by phase detector 110 as a negative signal or "0" while the signal of the second phase on line 108 will be interpreted by phase detector 112 as a positive signal or a "1". Accordingly, the outputs on lines 120 and 122 will be "0,1" respectively indicating the object is in the far range. This signal may be used, for example to move the optics further away from the object or to provide an indication to the operator. Now as the object moves into the ok zone, radiation from the object will cross from detector 70 to detector 72 but will remain primarily on detector 80. In this event, the signal from detector 72 will become greater than the signal from detector 70 and the output from amplifier 94 will now change to a signal of the second phase or plus while the output of amplifier 100 will remain a signal of the second phase. These two second phase signals will be detected by phase detectors 110 and 112 as "1" signals and thus an output on lines 120 and 122 of "1,1" will indicate the object is in the ok range. This signal may be used, for example, to stop the motion of a robot arm to which the apparatus is attached or to stop the filling of a container or merely to provide an indication to an operator. Now as the object moves beyond the near limit of the ok range, the radiation from the object will continue to be primarily on detector 72 but will now cross over to be primarily on detector 82. In this event, the output of amplifier 94 will continue to be a signal of the second phase but now the output of amplifier 100 will change to a signal of the first phase or minus and the output of phase detector 110 will be a "1" while the output of phase detector 112 will be a "0". Accordingly, the output on lines 120 and 122 is "1,0" indicating that the object is in the near range. This signal may be used, for example, to move the optics closer to the object or to provide an indication to an operator.

If the object is closer to the optical system than the near limit or is further away from the optical system than the far limit, then substantially no useable signal will be received by either of the detectors in either of the pairs. In this event, amplifiers 94 and 100 will be biased so as to produce a signal of the first phase and thus the output of detectors 110 and 112 will both be "0". Accordingly the output on lines 120 and 122 is a "0,0" indicating default. The default signal may then be used, for example, to alert the operator to the fact that the object is out of the normal operating range of the system.

If a larger ok zone is needed, then detectors 80 and 82 can be moved further to the left so that as the object moves from far to near it will move further before it hits the cross over line between detectors 80 and 82. If the ok zone is desired to be less, then detectors 80 and 82 should be moved to the right so that as the object moves to the near zone it will cross the line between detectors 80 and 82 at a nearer point.

It is thus seen that I have provided an apparatus which can be used to provide indication of the proximity of an object and which can be adjusted for range and width of zone in a very accurate, simple, and inexpensive way. Many obvious modifications to the apparatus disclosed will occur to those skilled in the art. For example, the detectors in the present application are shown to be mounted on opposite sides of a beam splitter, the reflected energy could be directed to the detector pairs over completely different paths and a beam splitter would not be required. Likewise, while a prism has been shown in the optical path, the prism only aids in moving the focus point further away from the optic axis and if there is enough room for the components nearer the optic axis, the prism is not necessary. Likewise, a filter has not been shown in the preferred embodiment but can be placed in the return path of the light or in both paths so as to pass only the frequency transmitted by the projector and eliminate noise from surrounding scene. It likewise may be useful to have the amplifiers tuned to the modulation frequency to minimize the effect of DC ambient light changes in the system. Also an LED has been shown as the device for emitting light into the system but other light emitting sources such lasers could equally be utilized. Finally, while I have shown one preferred system including differential amplifiers and phase detectors for determining which of the detectors the reflected energy is primarily falling on, it will be apparent to those skilled in the art that may alternate ways are available for making this determination. I therefore do not wish to be limited by the specific elements used in connection with the preferred embodiment but intend only to be limited by the scope of the appended claims.

I claim:

1. A position sensing device comprising:
   sending means for projecting radiation toward a remote object;
   a first pair of radiation detectors mounted to receive radiation reflected from the object, a first detector and a second detector of said first pair receiving substantially the same amount of radiation reflected from the object when the object is at a first predetermined range, the first detector of the first pair receiving more radiation reflected from the object than the second detector of the first pair when the object is nearer than the first predetermined range and the second detector of the first pair receiving more radiation reflected from the object than the first detector of the first pair when the object is further than the first predetermined range;

a second pair of radiation detectors mounted to receive radiation reflected from the object, a first detector and a second detector of said second pair receiving substantially the same amount of radiation reflected from the object when the object is at a second predetermined range, the first detector of the second pair receiving more radiation reflected from the object than the second detector of the second pair when the object is nearer than the second predetermined range and the second detector of the second pair receiving more radiation reflected from the object than the first detector of the second pair when the object is further than the second predetermined range; and sensing means connected to said first and second pair of radiation detectors and operable to produce a first output signal to indicate that the object is between the first and second predetermined ranges.

2. Apparatus according to claim 1 wherein said sensing means produces a second output signal to indicate that the object is nearer than the first predetermined range and produces a third output signal to indicate that the object is further than the second predetermined range.

3. Apparatus according to claim 1 wherein said second pair of detectors is moveable so that the relative positions of the first and second predetermined ranges can be changed.

4. Apparatus according to claim 1 wherein radiation reflected from the object passes through lens means to be focused substantially on said first and second pairs of detectors.

5. Apparatus according to claim 4 wherein radiation passing through the lens means also passes through beam splitting means so that a first portion of the radiation is focused substantially on the first pair of detectors and a second portion of the radiation is focused substantially on the second pair of detectors.

6. Apparatus according to claim 2 wherein said sensing means comprises:

first difference means connected to the first and second detectors of said first pair and operable to produce a first resultant signal indicative of which of the detectors of said first pair receives more radiation;

second difference means connected to the first and second detectors of said second pair and operable to produce a second resultant signal indicative of which of the detectors of said second pair receives more radiation; and signal processing means connected to the first and second difference means to receive the first and second resultant signals and to produce the first, second, and third output signals in accordance therewith.

7. Apparatus according to claim 6 wherein the first resultant signal is a logic "1" when the first detector of said first pair receives more radiation and a logic "0" when the second detector of said first pair receives more radiation, the second resultant signal is a logic "1" when the first detector of said second pair receives more radiation and a logic "0" when the second detector of said second pair receives more radiation.

8. Apparatus according to claim 7 further including an oscillator connected to said sending means to modulate the radiation projected thereby.

9. Apparatus according to claim 8 wherein the first and second difference means includes first and second differential amplifiers connected to said first and second pairs of detectors respectively to produce outputs the phase of which is indicative of which detectors in said first and second pairs receives the most radiation and first and second phase detectors each connected to the oscillator and respectively connected to the first and second differential amplifiers to receive the outputs therefrom and operable to produce a "1" resultant signal when receiving a signal of the first phase and a "0" resultant signal when receiving a signal of the second phase.

10. Position detecting apparatus comprising:

projecting means for directing radiation towards a remote object;

first and second radiation detectors mounted adjacently with a first null line therebetween and operable to receive radiation reflected from the remote object so that at a first range the radiation reflected from the object falls substantially about the first null line and the first and second detectors receive substantially the same amount of reflected radiation, reflected radiation falling more on the first and second detectors than the first range and reflected radiation falling more on the second detector when the object is further from the first and second detectors than the first range;

third and fourth radiation detectors mounted adjacently with a second null line therebetween and operable to receive radiation reflected from the object so that at a second range the radiation reflected from the object falls substantially about the second null line and the third and fourth detectors received substantially the same amount of reflected radiation, reflected radiation falling more on the third and fourth detectors than the second range and reflected radiation falling more on the fourth detector when the object is further from the third and fourth detectors than the second range; and sensing means connected to the first, second, third, and fourth detectors and operable to produce a first output signal to indicate that the object is between the first and second ranges.

11. Apparatus according to claim 10 wherein said third and fourth detectors are moveable so as to change the position of the second null line.

12. Apparatus according to claim 10 wherein said sensing means produces a second output signal to indicate that the object is nearer than the first range and a third output signal to indicate that the object is further than the second range.

13. Apparatus according to claim 10 wherein the radiation reflected from the object passes through a partly reflecting mirror and the radiation therethrough passes to the first and second detectors while the radiation reflected therefrom passes to the third and fourth detectors.

14. Apparatus according to claim 10 wherein the radiation reflected from the object passes through lens means so as to be focused substantially on the first, second, third, and fourth detectors.

15. Apparatus according to claim 10 wherein said sensing means comprises a first difference device connected to said first and second detector and operable to produce a first resultant signal indicative of which of the first and second detectors receives more radiation, a second difference device connected to said third and fourth detectors and operable to produce a second resultant signal indicative of which of the third and fourth detectors receives more radiation and analyzing means connected to the first and second difference devices to receive the first and second resultant signals and to produce the first output signal in accordance therewith.

16. Apparatus according to claim 12 wherein said sensing means comprises a first difference device connected to said first and second detectors and operable to produce a first resultant signal indicative of which of the first and second detectors receives more radiation, a second difference device connected to said third and fourth detectors and operable to produce a second resultant signal indicative of which of the third and fourth detectors receives more radiation and analyzing means connected to the first and second difference devices to receive the first and second resultant signals and to produce the first, second and third output signals in accordance therewith.

17. Apparatus according to claim 16 wherein the first resultant signal is of a first phase when the first detector receives more radiation, is of a second phase when the second detector receives more radiation, the second resultant signal is of the first phase when the third detector receives more radiation, is of the second phase when the fourth detector receives more radiation and wherein said analyzing means comprises a first phase detector to receive the first resultant signal and to produce a first logic signal which is a "1" when the first resultant signal is of the first phase and a "0" when the first resultant signal is of the second phase, a second phase detector to receive the second resultant signal and to produce a second logic signal which is a "1" when the second resultant signal is of the first phase and a "0" when the second resultant signal is of the second phase.

18. Apparatus according to claim 17 wherein the analyzing means produces a fourth output signal when the first logic signal is a "0" and the second logic signal is a "0".

19. Apparatus according to claim 17 further including oscillator means connected to said projecting means to modulate the radiation directed toward the object.

20. Apparatus according to claim 19 wherein the first and second phase detectors are also connected to said oscillator means.

21. Apparatus according to claim 14 wherein the lens mean is moveable in order to establish the first range.

22. Apparatus according to claim 10 wherein said first and second detectors are moveable so as to change the position of the first null line.

23. Apparatus according to claim 11 wherein said first and second detectors are moveable so as to change the position of the first null line.

24. Apparatus according to claim 1 wherein the first and second pairs of radiation detectors receive radiation reflected from the object at the same time.

25. Apparatus according to claim 10 wherein the first and second pairs of radiation detectors receive radiation reflected from the object at the same time.

26. Apparatus according to claim 1 wherein the first detector and the second detector of the first pair of radiation detectors substantially abut each other to minimize the distance between them and wherein the first detector and the second detector of the second pair of radiation detectors abut each other to minimize the distance between them.

27. Apparatus according to claim 10 wherein the first and second radiation detectors are substantially abutting to minimize the width of the first null line and wherein the third and fourth radiation detectors are substantially abutting to minimize the width of the second null line.

* * * * *